Jan. 17, 1956     L. H. GROEPER     2,731,599
VARIABLE RELUCTANCE ROTARY SPEED SENSING ELEMENT
Filed June 10, 1952
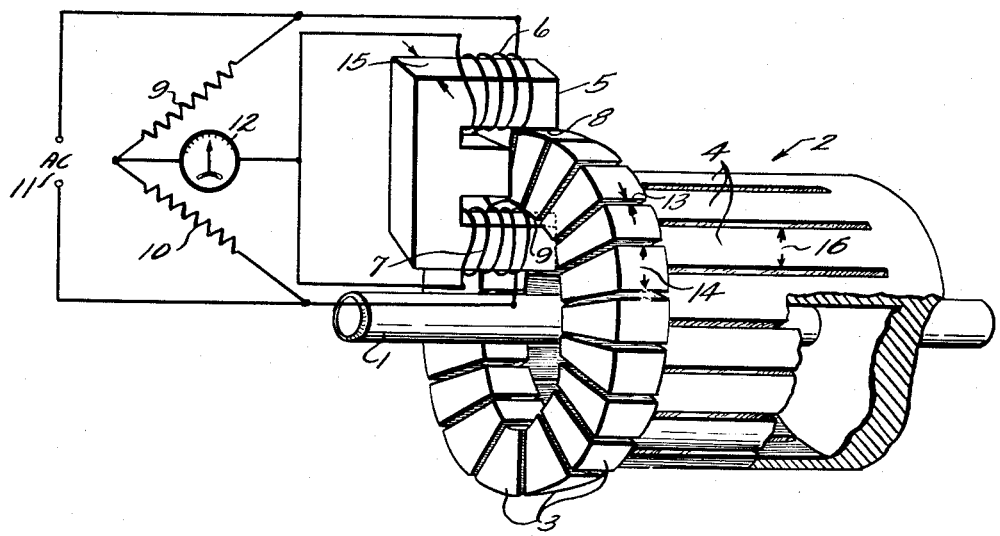
INVENTOR.
L. H. GROEPER United States Patent Office 2,731,599
Patented Jan. 17, 1956

2,731,599

VARIABLE RELUCTANCE ROTARY SPEED SENSING ELEMENT

Lawrence H. Groeper, Canoga Park, Calif., assignor to the United States of America as represented by the Secretary of the Air Force Application June 10, 1952, Serial No. 292,757

6 Claims. (Cl. 324—70)

This invention relates to magnetic speed sensing elements.

Previous types of speed sensing elements usually consisted of a generator (either A. C. or D. C.) or a contact making device and a recorder or indicator which is sensitive to voltage or frequency. With such systems the measurement is not truly continuous but is an average of periodic sampling. The rate of sampling is dependent upon the speed itself and therefore as the speed approaches zero the time between samples approaches infinity.

The previous known types of rotary speed sensing elements are especially undesirable when a record is desired of the acceleration of a machine from a standpoint to full speed. As a general rule with any intermittent measuring device, the number of samples per second must bear a 10 to 1 ratio to the maximum frequency of variation which is to be investigated. Thus the previous known speed sensing elements are not at all suitable for measuring variation at low speed and even at rated speed are suitable only for low frequency variations.

It is an object of this invention to provide a simple speed sensing device which will produce a continuous measurement corresponding to speed, at low as well as higher speed.

It is a further object of this invention to provide a rotary speed sensing element whose output characteristics do not depend on the speed being measured but rather depend on the design of the speed sensing element.

The above objects as well as other objects, features and advantages of this invention will be more clearly understood in view of the following description when taken in conjunction with the drawing wherein the single figure is a perspective view partly in section of a speed sensing element constructed in accordance with the principles of this invention.

Referring now to the drawing, the shaft 1 whose rotary speed is to be sensed has secured thereto a cup shaped rotor generally indicated at 2. The lip portion of the cup has a plurality of slabs 3 of magnetic material and the wall of the cup shaped rotor has longitudinal slots cut therein so as to form a plurality of reeds 4 thereby producing a reed type support for each of the slab members 3. With this arrangement the slab members 3 are mounted in circular arrangement about the shaft 1 and each of those slabs will move radially outward from the shaft due to centrifugal force resulting from rotation of the shaft 1, the amount of this deflection will be a function of the square of the speed. The slabs 3 being of magnetic material are used as armatures and constitute an armature assembly, each slab being an armature segment. The slabs are positioned in a magnetic circuit which preferably includes an E shaped core member 5 having a winding 6 on one of its outer legs and a winding 7 on the other of its outer legs. The core member 5 is so positioned that the magnetic slabs 3 form a first air gap 8 which is equal to a second air gap 9 when the shaft 1 is not rotating. The two windings 6 and 7 may be connected in a suitable bridge circuit such as for example the circuit illustrated in the drawing which shows that the winding 6 and the winding 7 together with the impedance 9 and the impedance 10 make up the four arms of the bridge and a suitable source of alternating current 11 is applied to one of the diagonals of the bridge and a suitable indicating device such as meter 12 is connected to the other diagonal of the bridge. Since the amount of deflection of the armatures is a function of the square of the speed being sensed, a non-linear scale on the meter 12 will result which provides greater readability at the upper end. If this is not desired, electrical or mechanical compensation may be incorporated in a well known manner to provide a linear scale.

It will be appreciated that the armature assembly, consisting of the armature segments or slabs 3, is mounted to rotate with the shaft the speed of which is to be measured. As the armature assembly rotates the armature segments pass through the magnetic field of the air gap in succession, thereby influencing the reluctance of the magnetic circuit. The reed type support permits the armature segments to be radially displaced within the air gap in response to centrifugal forces. The displacement of the armature segments causes the reluctance of the magnetic circuit to vary as a function of the speed of rotation. The variation of reluctance is sensed by the windings 6 and 7 and the remainder of the bridge circuit to produce a measurement corresponding to speed.

The size of the core 5 and the armatures should be such that the thickness of the core 5 (indicated as 15 on the drawing) is equal to the thickness of the armature (indicated as 14 on the drawing) plus the spacing between armatures (indicated as 13 on the drawing) when the shaft 1 is stationary. This selection of particular sizes will result in one and only one slot in the air gap at any angular position of a shaft 1 thus minimizing ripple. In the design, another consideration should be that the thickness 14 of the armatures should be great enough that the width of the reed (indicated as 16 on the drawing) will cause the reed to resist deflection at right angles to the intended deflection.

The preferred embodiment of this invention described above is incorporated in an impedance type measuring circuit whereby the variations in reluctance are represented by measurable changes in inductance of an impedance network. It will be appreciated that this invention could as well be used with other systems for sensing and measuring the changes in reluctance of the magnetic circuit in response to speed. Also the circuit need not be of the balanced bridge type but could as well be a more simple circuit. The various systems in which this invention could be incorporated are well known and many are described on pages 41 to 97 of "Mechanical Measurements by Electrical Methods" by Howard C. Roberts, published by the Instrument Publishing Co. Inc., Pittsburgh, Pa., 1946.

What is claimed is:

1. A magnetic speed sensing device comprising a plurality of armatures of magnetic material arranged in a circle whose center is located at a point on the axis of rotation of the shaft whose speed is to be sensed, means to support each of said armatures so that each will move radially of said circle due to centrifugal force resulting from rotation of said shaft, a magnetic circuit including an air gap positioned such that said armatures pass through said air gap in succession and positioned so that the magnetic relation of said armatures with respect to said air gap is such that the reluctance of said air gap is a function of radial movement of said armatures and means for sensing changes in reluctance of said magnetic circuit.

2. A magnetic speed sensing device comprising a plurality of armatures of magnetic material arranged in a circle whose center is located at a point on the axis of rotation of the shaft whose speed is to be sensed; means to support each of said armatures so that each will move radially of said circle due to centrifugal force resulting from rotation of said shaft; an E shaped magnetic core member positioned such that said armatures pass between but spaced from the two outside legs of the E shaped magnetic core member and adjacent to but spaced from the middle leg of said E shaped magnetic core member thereby defining a first magnetic circuit including one of said outside legs, said armatures and said center leg of said E shaped magnetic core member, and a second magnetic circuit including the other of said outside legs, said armature and said center leg of said E shaped magnetic core member; said E shaped magnetic core member being also positioned so that the length of said air gap between said armatures and said one of said outside legs of said E shaped magnetic core member will be increased and the length of the air gap between said armatures and said other of said outside legs of said E shaped magnetic core member will be decreased as a function of radial movement of said armatures; a first electrical winding on one of said legs responsive to changes in flux of said first magnetic circuit, a second winding on another of said legs responsive to changes in flux of said second magnetic circuit, and sensing means having an energizing circuit including said first electrical winding and said second electrical winding.

3. A magnetic speed sensing device adapted for use in measuring the rotational speed of a shaft comprising: a circular armature assembly having a plurality of armature segments; means for supporting the armature assembly so as to be rotated with the shaft the speed of which is to be sensed; a magnetic circuit including an air gap located adjacent the armature assembly and positioned so that the armature segments pass through the magnetic field of said air gap in succession upon rotation of the armature assembly, to thereby influence the reluctance of the magnetic circuit; said armature assembly supporting means including means permitting radial displacement of the armature segments in response to centrifugal forces upon rotation of the armature assembly, to thereby cause the reluctance of the magentic circuit to vary as a function of the speed of rotation of the shaft; and means for sensing the variations in reluctance of said magnetic circuit.

4. A device according to claim 1 wherein the armature assembly supporting means permitting radial displacement of the armature segments includes a cup-shaped member mounted on the shaft, the cup-shaped member being longitudinally slotted forming a plurality of reeds to provide a reed type support for each of the armature segments.

5. A magnetic speed sensing device adapted for use in measuring the rotational speed of a shaft comprising: a circular armature assembly having a plurality of armature segments; means for supporting the armature assembly so as to be rotated with the shaft the speed of which is to be sensed; an E-shaped magnetic core member located adjacent the armature assembly and positioned so that upon rotation of the armature assembly the armature segments pass in succession between, but spaced from, the two outside legs of the E-shaped magnetic core member and adjacent to, but spaced from, the middle leg of the E-shaped magnetic core member; said E-shaped magnetic core member and said armature assembly thereby defining a pair of magnetic circuits each including the middle leg, one of the outer legs, the armature assembly, and an air gap between the outer leg and the armature assembly; said armature assembly supporting means including means permitting radial displacement of the armature segments in response to centrifugal forces upon rotatation of the armature assembly, to thereby cause the reluctance of said magnetic circuits to vary as a function of the speed of rotation of the shaft as a result of increasing, or decreasing, said air gaps; and means for sensing the variations in reluctance of said magnetic circuits.

6. A device according to claim 5 wherein the armature assembly supporting means permitting radial displacement of the armature segments includes a cup-shaped member mounted on the shaft, the cup-shaped member being longitudinally slotted forming a plurality of reeds to provide a reed type support for each of the armature segments.

References Cited in the file of this patent

UNITED STATES PATENTS

| | | |
|---|---|---|
| 1,768,220 | Sousedik | June 24, 1930 |
| 1,955,111 | Buckler | Apr. 17, 1934 |
| 2,319,940 | Morrison | May 25, 1943 |
| 2,331,128 | MacNeil | Oct. 5, 1943 |
| 2,528,534 | Meister | Nov. 7, 1950 |
| 2,541,422 | Kirkland | Feb. 13, 1951 |